United States Patent
Rozen et al.

(10) Patent No.: US 10,692,492 B2
(45) Date of Patent: Jun. 23, 2020

(54) TECHNIQUES FOR CLIENT-SIDE SPEECH DOMAIN DETECTION USING GYROSCOPIC DATA AND A SYSTEM USING THE SAME

(71) Applicants: Piotr Rozen, Gdansk (PL); Tobias Bocklet, Munich (DE); Jakub Nowicki, Gdansk (PL); Munir Georges, Kehl (DE)

(72) Inventors: Piotr Rozen, Gdansk (PL); Tobias Bocklet, Munich (DE); Jakub Nowicki, Gdansk (PL); Munir Georges, Kehl (DE)

(73) Assignee: Intel IP Corporation, Santa Clara, CA (US)

( * ) Notice: Subject to any disclaimer, the term of this patent is extended or adjusted under 35 U.S.C. 154(b) by 4 days.

(21) Appl. No.: 15/721,486

(22) Filed: Sep. 29, 2017

(65) Prior Publication Data

US 2019/0103100 A1    Apr. 4, 2019

(51) Int. Cl.
*G10L 15/22* (2006.01)
*G06N 5/04* (2006.01)
(Continued)

(52) U.S. Cl.
CPC .............. *G10L 15/22* (2013.01); *G06F 3/167* (2013.01); *G10L 15/08* (2013.01); *G10L 15/183* (2013.01);
(Continued)

(58) Field of Classification Search
CPC ....... G06F 17/289; G06F 3/1423; G06N 5/04; G10L 15/22; G10L 15/1822; G10L 15/01; H04W 76/10
(Continued)

(56) References Cited

U.S. PATENT DOCUMENTS 6,735,562 B1    5/2004 Zhang et al.
8,185,392 B1*   5/2012 Strope ..................... G10L 15/01
                                                 704/252
(Continued)

OTHER PUBLICATIONS

Unpublished U.S. Appl. No. 15/483,246. (P110925).
(Continued)

*Primary Examiner* — Farzad Kazeminezhad
(74) *Attorney, Agent, or Firm* — Grossman, Tucker, Perreault & Pfleger, PLLC

(57) ABSTRACT

Techniques are disclosed for client-side analysis of audio samples to identify one or more characteristics associated with captured audio. The client-side analysis may then allow a user device, e.g., a smart phone, laptop computer, in-car infotainment system, and so on, to provide the one or more identified characteristics as configuration data to a voice recognition service at or shortly after connection with the same. In turn, the voice recognition service may load one or more recognition components, e.g., language models and/or application modules/engines, based on the received configuration data. Thus, latency may be reduced based on the voice recognition engine having "hints" that allow components to be loaded without necessarily having to process audio samples first. The reduction of latency may reduce processing time relative to other approaches to voice recognitions systems that exclusively perform server-side context recognition/classification.

19 Claims, 8 Drawing Sheets

(51) Int. Cl.
| | |
|---|---|
| *G10L 15/18* | (2013.01) |
| *G10L 15/01* | (2013.01) |
| *G06F 3/14* | (2006.01) |
| *H04W 76/10* | (2018.01) |
| *G10L 15/30* | (2013.01) |
| *G10L 15/08* | (2006.01) |
| *G10L 15/183* | (2013.01) |
| *G06F 3/16* | (2006.01) |
| *G10L 17/00* | (2013.01) |
| *G10L 25/63* | (2013.01) |
| *G10L 25/60* | (2013.01) |
| *G10L 15/00* | (2013.01) |

(52) U.S. Cl.
CPC ............ *G10L 15/30* (2013.01); *G06F 3/1423* (2013.01); *G10L 15/005* (2013.01); *G10L 15/01* (2013.01); *G10L 17/005* (2013.01); *G10L 25/60* (2013.01); *G10L 25/63* (2013.01); *G10L 2015/088* (2013.01); *G10L 2015/223* (2013.01); *G10L 2015/227* (2013.01); *H04W 76/10* (2018.02)

(58) Field of Classification Search
USPC .......................................... 704/70, 249, 252
See application file for complete search history.

(56) References Cited

U.S. PATENT DOCUMENTS 9,361,881 B2 * 6/2016 Gilbert .................... G10L 15/26
2007/0003110 A1 1/2007 Gutta et al.
2007/0136068 A1 * 6/2007 Horvitz ................. G06F 17/289
 704/270
2007/0136222 A1 * 6/2007 Horvitz .................... G06N 5/04
 706/45
2010/0268537 A1 10/2010 Al-Telmissani
2014/0025377 A1 * 1/2014 Koch .................. G10L 15/1822
 704/249
2014/0278389 A1 9/2014 Zurek et al.
2016/0127816 A1 * 5/2016 Mickelsen ............. G10L 15/22
 381/56
2017/0287490 A1 10/2017 Biswal et al.
2018/0098367 A1 * 4/2018 Pezdirc ................. H04W 76/10
2019/0324634 A1 * 10/2019 Gao ...................... G06F 3/1423

OTHER PUBLICATIONS

Unpublished U.S. Appl. No. 15/483,421. (P113702).
Unpublished U.S. Appl. No. 15/855,379. (D137783).
Unpublished U.S. Appl. No. 15/621,029. (P110674).
International Search Report and Written Opinion issued in PCT Application No. PCT/US2017/018716, dated Jun. 12, 2017, 11 pages.
Poh, Norman, et al.: "Improving Fusion with Margin-Derived Confidence in Biometric Authentication Tasks", International Conference on Audio and Video-Based Biometric Person Authentication (AVBPA 2005), LNCS 3546, IDIAP Research Institute, 2005, 10 pages.

* cited by examiner

TECHNIQUES FOR CLIENT-SIDE SPEECH DOMAIN DETECTION USING GYROSCOPIC DATA AND A SYSTEM USING THE SAME

FIELD

The present disclosure is generally directed to speech recognition processes and systems implementing the same, and in particular, to techniques for client-side speech domain detection to provide speech recognition services with context/configuration parameters that allow the same to pre-load one or more models (e.g., language models, acoustic and/or dialog models) into memory prior to receiving and analyzing audio samples.

BACKGROUND

Cloud-base speech services and other voice-recognition services generally include numerous models and databases, e.g., language and acoustic models and models and databases for different information domains, end-user devices and so on, to allow for performance of speech recognition tasks. Each model may be directed to specific aspects of audio processing such as identifying the acoustic environment for the captured audio, e.g., for noise-cancellation purposes, and to aid in determining the content of the speech such as the particular language of the speaker. Other models may also be utilized in order to identify the particular type of voice task the user desires. Such tasks may include, for example, navigational commands, calendar/scheduling functions, Internet searches, and other general questions/tasks that may be satisfied through one or more artificial intelligence engines in combination with additional knowledge sources. Often a user has no awareness of the number of models and application engines/modules utilized for even the simplest of voice commands as cloud-based speech services hide much of the complexity from view.

However, the storage size of models can be relatively large, particularly for language models. Language models directed to specific clients/end-users may require gigabytes of storage. As systems scale from hundreds to thousands of clients/end-users, and beyond, the storage costs increase proportionally. Some approaches to scale voice services include cluster configurations which achieve efficiencies through distributing models and application engines/modules among various storage and application nodes, respectively. However, such distribution requires that each request to perform speech recognition be handled by a server-side manager (sometimes referred to as a grid manager) that is able to retrieve necessary models from the storage nodes and interact with application nodes as needed. The response time to handle each voice request is thus directly related to the delay to acquire voice samples by the speech services system, the time to analyze the received audio samples to determine appropriate models/applications, the time to load those models for further processing, and then the processing of received audio samples using the loaded language models and applicable applications to determine a final result.

The grid manager required by such speech services systems thus acts as a middleman that unfortunately introduces latencies which increase the overall amount of time between a user issuing a voice request/command to a device and the speech services system ultimately providing a final response back to the requesting device. Even relatively minor delays, e.g., in the tens of milliseconds, serves to decrease usability of such systems and impedes continued adoption of speech-enabled services/devices by users.

Figure 1:
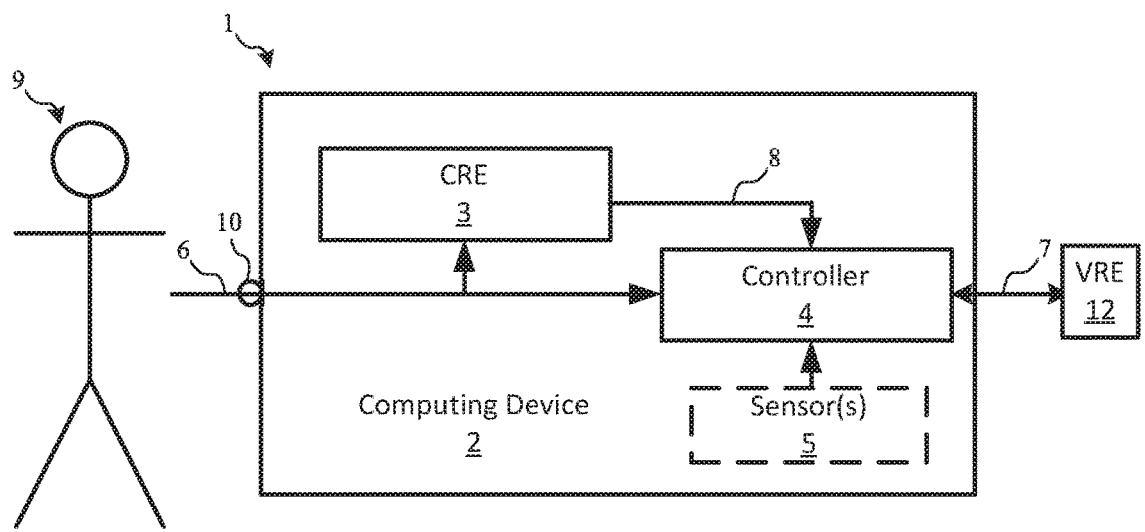
FIG. 1 is a block diagram of an example speech recognition system in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

As discussed above, speech recognition systems often suffer from latencies associated with the identification and retrieval of relevant models and applications. Some approaches to reducing latency include avoiding any runtime customization altogether. Runtime customization generally includes adapting models to a specific speaker, e.g., sometimes referred to as user adaption, and loading one or more language-dependent models. In many applications, this tradeoff is unacceptable as users increasingly expect a level of runtime customization that accommodates their personal attributes and preferences. Some other approaches include highly-specialized architectures with dedicated hardware that is optimized for voice recognition processing. Such hardware is often impractical due to expense, and often such hardware becomes obsolete soon after deployment.

Still other approaches to reducing latency includes reducing the streaming chunk size, e.g., the overall size of each chunk of captured audio. This may reduce latency as this translates into shorter wait times before a streaming buffer is full and ready to be sent. Continuous streaming may also reduce the latency as all the models may be loaded and kept in memory in order to process the continuous audio stream. However, both approaches dramatically increase network bandwidth usage, and assumes an always available data stream of low cost. Further, systems that implement such chunk size restrictions and/or continuous audio streams suffer from scaling complications as only so many users may be connected simultaneously before performance degrades, i.e., latency increases.

Thus, in accordance with an embodiment of the present disclosure, techniques are disclosed for client-side analysis of audio samples to identify one or more characteristics associated with captured audio. The client-side analysis may then allow a user device, e.g., a smart phone, laptop computer, in-car infotainment system, and so on, to provide the one or more identified characteristics as configuration data to a voice recognition engine at or shortly after establishing a connection to the same. In turn, the voice recognition engine may load one or more language components, e.g., language models and/or application modules/engines, based on the received configuration data. The language components may also be referred to as speech recognition and understanding components, or simply recognition components. Thus, the techniques disclosed herein may advantageously reduce the amount of time, i.e., latency, to perform processing of audio samples based on the voice recognition engine having, in a general sense, "hints" that allow language components to load without necessarily having to process audio samples. A voice recognition system consistent with the present disclosure may therefore reduce response time, e.g., have a higher average real-time factor (RTF), relative to other approaches to voice recognitions systems that exclusively perform server-side context recognition/classification.

In more detail, and in an embodiment, a computing device consistent with the present disclosure includes a context recognition engine (CRE), a controller, one or more audio capture devices, e.g., microphones, and optional sensors such as global positioning system (GPS), accelerometers, gyroscopes, etc. The computing device may continuously capture audio via the one or more audio capture devices and provide the same as audio samples to the CRE and the controller. The CRE may include N number of stages for context recognition such as an Acoustic Context Engine (ACE) for determining one or more environmental/signal quality classifications, a Language and Speaker Context Engine (L/SCE) for identifying a speaker and/or the particular language spoken by a user, and a Linguistic Context Engine (LCE) for natural language processing to detect one or more domain classifications. Other CRE configurations are within the scope of this disclosure, and the CRE configurations discussed variously are not intended to be limiting. In any event, the output of the CRE may be utilized by the controller to provide configuration data/parameters to a voice recognition engine to reduce or otherwise eliminate the voice recognition engine from having to perform so-called server-side context/domain classifications on the received audio samples. Instead, a voice recognition engine may utilize the provided configuration parameters to instantiate language components and immediately begin processing received audio samples without an intermediate classification stage.

As generally referred to herein a voice recognition engine refers to any device configured to perform voice recognition processes. In one specific example, the voice recognition engine may comprise a cloud-based speech recognition service that is accessible via a network, e.g., the Internet. However, this disclosure is not limited in this regard and is applicable to any device that enables voice recognition processing via distributed components/chips. For example, details disclosed herein are applicable to a wearable device (e.g., computer glasses, wrist-worn computer, and so on) connected with a smart phone, and a smart phone connected to a car head-unit. Details disclosed herein may also be implemented within a single device. For instance, a first controller such as a power saving digital signal processor (DSP)/co-processor may implement the client-side analysis variously disclosed herein while a second controller, a general CPU, may implement the voice recognition engine components.

Now referring to the figures, FIG. 1 shows an example speech processing system 1 in accordance with an embodiment of the present disclosure. The example speech processing system 1 is shown in a highly simplified form and other embodiments are within the scope of this disclosure. As shown, the example speech processing system 1 includes a computer device 2. The computer device 2 may comprise, for example, a smart phone, tablet device, laptop computer, in-car audio/infotainment system or any other computer device having one or more microphones, e.g., microphone 10. In one example embodiment, the computer device 2 may be implemented as the computer device 500 of FIG. 5.

As further shown, the computer device 2 includes a context recognition engine (CRE) 3, a controller 4, a microphone 10, and one or more optional sensors 5. As discussed further below, the microphone 10 may be utilized to capture audio samples 6 from one or more users, e.g., such as user 9, and the captured audio samples may be provided to the CRE 3 and the controller 4 for further processing.

The controller 4 may comprise one or more processing devices/circuits such as, for example, a field-programmable gate array (FPGA), Reduced Instruction Set Computer (RISC) processor, x86 instruction set processor, microcontroller, and/or an application-specific integrated circuit (ASIC). The controller 4 be configured to execute a plurality of instructions to carry out processes in accordance with various aspects and embodiments disclosed herein. For example, the controller 3 may be configured to execute the method/process of FIG. 3. This process may be implemented, for example, using software (e.g., C or C++ executing on the controller/processor), hardware (e.g., hardcoded gate level logic or purpose-built silicon) or firmware (e.g., embedded routines executing on a microcontroller), or any combination thereof. The optional sensor(s) 5 may comprise one or more of a global positioning system (GPS) sensor, speech detector sensor, accelerometer and/or a gyroscope.

The CRE 3 may be at least partially implemented within the controller 4, or may comprise one or more stand-alone chips. In an embodiment, the CRE 3 is implemented within a digital signal processor (DSP) or other dedicated hardware controller/processor to accelerate performance. The CRE 3 may receive audio samples 6 via the microphone 10 and output one or more identified context characteristics 8 to the controller 4. As discussed further below, the CRE 3 may continuously receive audio samples 6 from the user(s) 9 even when a user has not affirmatively engaged a push-to-talk feature of the computing device 2. For example, the computing device 2 may continually record audio in order to wait for the user(s) 9 to speak a specific key phrase such as "Hello Device."

Figure 2:
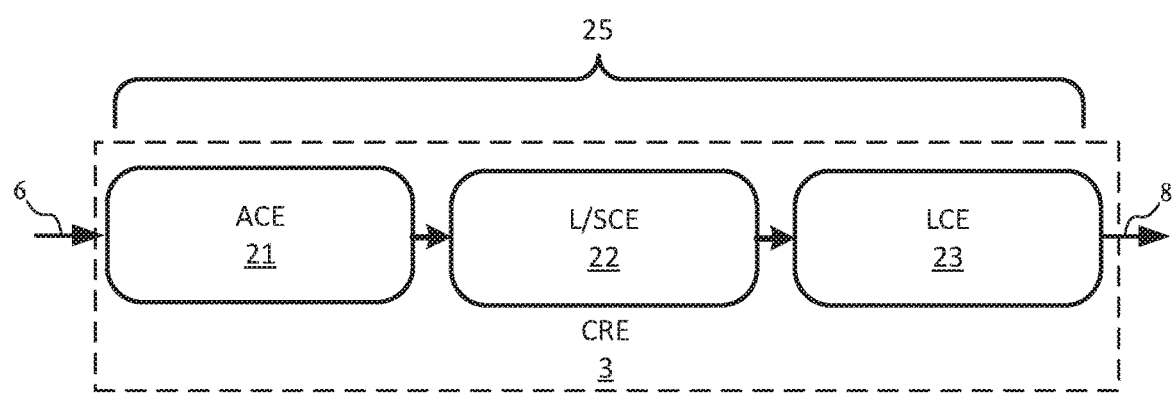
FIG. 2 shows an example context recognition engine (CRE) suitable for use within the speech recognition system of FIG. 1, in accordance with an embodiment of the present disclosure.

In any event, the CRE 4 may include N number of processing modules/stages that may also be implemented in hardware, software, or a combination thereof. As shown in FIG. 2, a plurality of processing stages 25 are shown including an Acoustic Context Engine (ACE) 21, a Language and Speaker Context Engine (L/SCE) 22, and a Linguistic Context Engine (LCE) 23. The audio samples 6 may processed by the plurality of stages 25 in a serial fashion, however this disclosure is not intended to be limited in this regard. The plurality of stages 8 may then identify one or more context classifications (or characteristics) associated with the audio samples 6 and may then output the one or more identified context classifications 8. Audio samples 6 may be streamed in response to user input, e.g., based on a spoken "wakeup" word/voice command, push-to-talk, and so on. Alternatively, the audio samples 6 may be streamed continuously, e.g., without user input.

The ACE 21 is configured to receive audio samples 6 and detect background/context information about the environment the computing device 2 is in. The background/context information may also be referred to as environmental characteristics/classifications. In a general sense, the ACE 21 may detect and classify an environment for the computing device 2 based on acoustic "hints." For example, the environment may be determined by acoustic analysis to detect public noises (e.g., a crowd of voices, vehicle noises, and so on), home environments, background noise, and noise from TVs and other media devices. Accordingly, environmental classifications may therefore include signal quality indicators such as a signal-to-noise ratio (SNR), reverberation characteristics, and so on. The environmental classifications may therefore be utilized to augment further processing by the ACE 21 and/or the LCE 23 by detecting the probability of a false positive, e.g., a TV producing audio versus the user(s) 9.

The ACE 21 may use a relatively coarse-grain model, e.g., a model that favors processing speed over confidence level, to compare samples to known environments to determine the particular environmental context/characteristics. The ACE 21 may perform background/context detection at a predetermined interval, e.g., every N seconds, or at random intervals. The ACE 21 may therefore implement a power saving scheme to reduce computing/power expense based on using coarse-grain analysis and having a relatively long period of time between sampling, e.g., up to about 60 seconds or more. However, this disclosure is not necessarily limited in this regard, and the ACE 21 may perform continuous sampling and analysis of audio samples 6.

The L/SCE 22 may be configured to identify one or more characteristics about the language represented within the audio samples such as speaker identity (e.g., for security purposes, and/or to avoid false activation of voice processing), spoken language, and/or speaker specific information, e.g., gender, number of speakers, age, emotional state, and fatigue level. The L/SCE 22 may be configured to continuously analyze the audio samples 6, or may be configured to perform analysis at predetermined intervals similar to operation of the ACE 21 discussed above.

The L/SCE 22 may utilize multiple models for identification purposes such as multiple language-specific phrase models. The L/SCE may be configured to implement implicit language identification, whereby the multiple language-specific language models may enable key or so-called "wake-up phrases" in multiple languages. For example, the L/SCE 22 may implement both French and English (North American and/or Great Britain dialect) language models. To this end, the computing device may be "awoken" for additional speech processing based on a predefined keyword spoken in English or French. The particular "wakeup" word/voice command may be programmable, e.g., based on user input, or may be static and set during manufacturing.

In any event, the L/SCE 22 may advantageously determine the language represented in the audio samples, which is to say the language of the user(s) 9, based on loading a plurality of language-specific language models and using the same to analyze the audio samples 6. Such detection may be based on detecting keywords within the audio samples, although other detection schemes may be utilized. In some cases, two or more languages may be detected. For instance, Portuguese and Spanish share common words, and therefore, the L/SCE 22 may identify a plurality of potential languages. The L/SCE 22 may determine a confidence score for each identified language, or may simply provide a list of potential languages.

In an embodiment, the L/SCE 22 may utilize the ACE 21 to improve recognition accuracy. For instance, the ACE 21 may be used to determine signal quality is too low for detection purposes, e.g., based on a measured SNR.

The LCE 23 may be utilized to analyze the audio samples 6 to identify one or more models that may be utilized by a voice recognition engine. In a general sense, the LCE 23 may identify linguistic "hints" (or linguistic characteristics) within the audio samples 6 to identify one or more models that may be utilized by a remote voice services system to accurately and efficiently analyze the speech represented within the audio samples 6. For instance, voice commands utilized by audio playback devices, e.g., "play", "next song", "stop", may be identified by the LCE 23 as associated with a media player model. On the other hand, voice commands such as "set a timer for five minutes" may cause the LCE 23 to identify a timer/clock model. The LCE 23 may utilize the L/SCE 22, for instance, in order to ensure that an appropriate language model is utilized when attempting to identify models that may be used to analyze the content of the speech within audio samples 6.

The LCE 23 may implement one or more routines for speech/voice analysis including automatic speech recognition (ASR) and natural language understanding (NLU) libraries. The routines of the LCE 23 may be implemented in software, hardware, or any combination thereof. In some cases, the LCE 23 utilizes low-complexity routines using a low-complex ASR and NLU for purposes of power saving and speed. For example, the LCE 23 may implement a low-complex common speech recognizer using statistical acoustic language models. The statistical acoustic language models may be implemented using recurrent neuronal networks and represented as weighted finite state transducers. The NLU may comprise several components/engines such as an intent detection classifier and/or a property recognizer based on condition random fields or deep and/or recurrent neuronal networks.

The various linguistic hints/characteristics identified by the LCE 23 may be used by the voice recognition engine 12 to adapt its language components, e.g., language models and language applications, to the domain identified within the hints, which is discussed in greater detail below. Each linguistic hint may directly correlate with a knowledge domain/language model, e.g., the linguistic hint may manifest as the name/ID of a particular language model to load, or may indirectly relate to a language model, e.g., may be classified as a category or keyword that is associated with one or more domain/language models. In either case, the voice recognition engine 12 may utilize the linguistic hints to adapt various language components to reduce or otherwise eliminate the necessity of an intermediate server-side stage to perform context/domain analysis. Note, the LCE 23 may not necessarily identify a single domain/language-model based on the linguistic hints, and thus two or more domains/language-models may be identified depending on the particular scenario.

Continuing on with FIG. 2, the CRE 3 may therefore output one or more identified characteristics 8. The one or more identified characteristics 8 may include, for example, environmental context information from the ACE 21, one or more language characteristics from the L/SCE 22, and/or one or more linguistic hints from the LCE 23. The one or more identified characteristics 8 may also be referred to as voice recognition engine configuration data, or simply configuration data.

In operation, the computing device 2 may utilize the CRE 3 to identify one or more characteristics associated with the audio samples 6. The computing device 2 may then initiate/establish a connection to the voice recognition engine 12. Once established, the computer device 2 may then send configuration data to the voice recognition engine 12. The configuration data may include the one or more characteristics identified by the CRE 3, and may allow the voice recognition engine 12 to adapt accordingly. The received configuration data may therefore allow the voice recognition engine 12 to load and configure various language and acoustic components without necessarily performing an intermediate stage to analyze audio samples to identify those applicable language components. This pre-initialization of voice recognition engine 12 may advantageously reduce latency between receiving audio samples and ultimately providing a final result back to the computing device 2.

Figure 3:
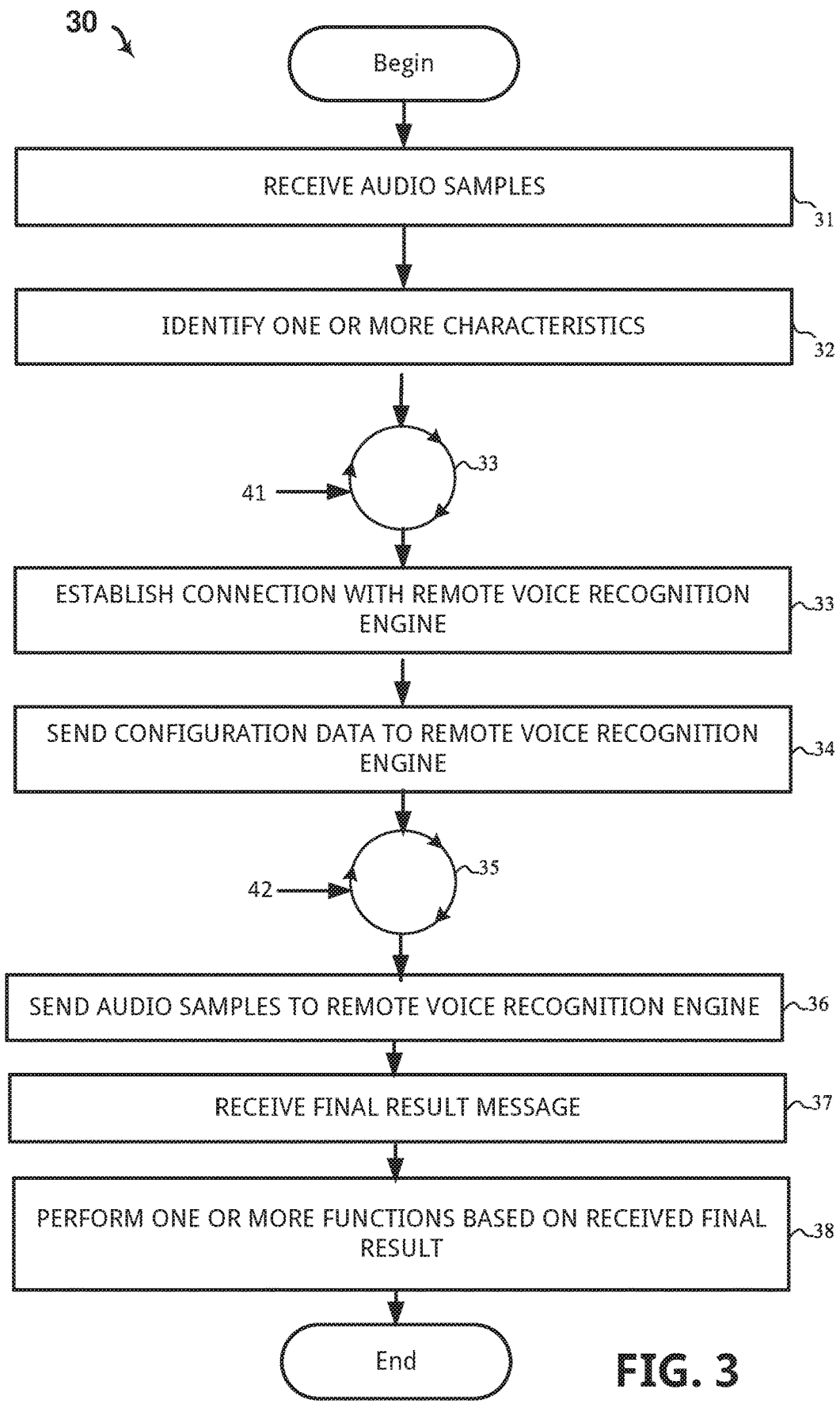
FIG. 3 shows an example speech recognition process, in accordance with an embodiment of the present disclosure.

As previously discussed, an embodiment of the present disclosure includes a process for performing client-side context/domain detection based on captured audio samples. One such example process 30 is shown in FIG. 3. The process 30 may be performed, in whole or in part, by the controller 4. However, the process 30 may also be performed by multiple chips/components of the computing device 2. The acts of process 30 may not necessarily be executed in the order given, and moreover, some acts may be omitted, added or otherwise augmented depending on a desired implementation.

In act 31, the controller 4 receives audio samples 6 from, for example, the microphone 10. In act 32, the controller identifies one or more context characteristics of the audio samples based at least in part on the CRE 3. In act 33, the controller 4 waits for a user event 41, e.g., a PTT, a user speaking a "wakeup" voice command, and so on. In response to receiving the user event 41, the controller 4 may then establish 33 a connection with a voice recognition engine, e.g., the voice recognition engine 12. The controller 4 may utilize, for instance, a secure socket layer (SSL) connection or other suitable protocol.

In act 34, the controller 4 may send the one or more context characteristics identified in act 32 as configuration data to the voice recognition engine (which may also be referred to as a speech recognition engine). In an embodiment, the controller 4 sends the one or more identified characteristics in a session initialization message. The controller 4 may then wait 35 for a confirmation message that indicates the voice recognition engine has loaded the necessary language components based on the configuration data. In act 36, the controller 4 sends one or more messages including captured audio to the voice recognition engine.

In act 37, the controller 4 receives a final result message from the voice recognition engine after the same processes the captured audio. The controller 4 may then perform 38 one or more functions/commands based on the received final result message. For example, the one or more functions/commands may include pausing, stopping, or selecting a particular music track to play. In another example, the more one more functions/commands may include playing back audio. In this example, a user may request that an appointment be added to a virtual calendar at a specific date and time. Thus, the controller 4 may present an on-screen message and/or initiate an audible message such as "Added a new appointment for Friday at 8 AM." The provided examples are not intended to be limiting and other functions/commands are within the scope of this disclosure.

Figure 4:
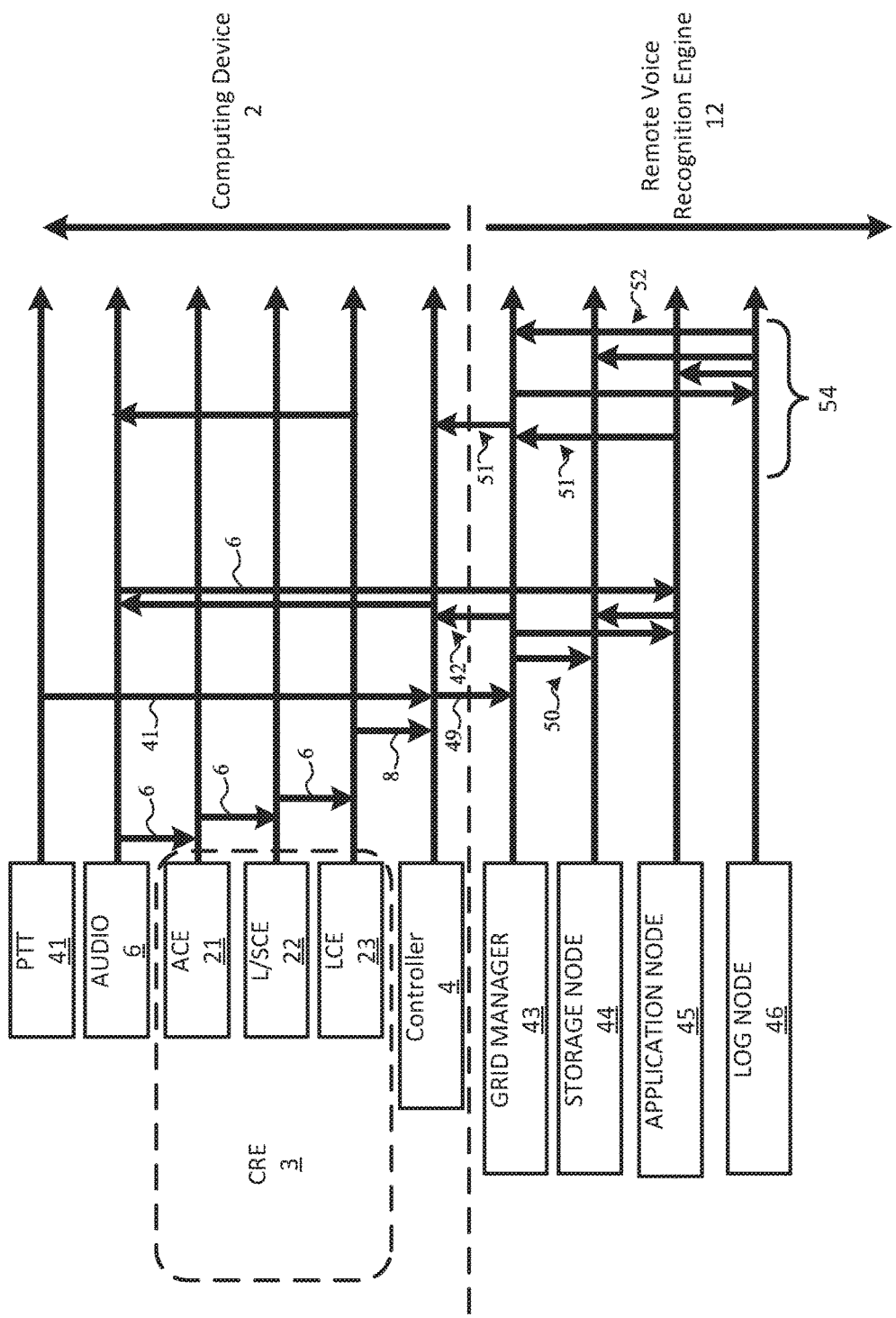
FIG. 4 shows an example process flow for a speech recognition process, in accordance with an embodiment of the present disclosure.

Some aspects of the present disclosure may be better understood by way of example. FIG. 4 shows an example process flow for the computing device 2 when communicating with a remote voice recognition engine in accordance with an embodiment. As shown, the computing device 2 may provide audio samples 6 to the CRE 3 without a user necessarily engaging a feature of the computer system 2, e.g., a PTT function. The audio samples 6 may be provided in a continuous fashion, e.g., without break or interruption, or provided in a non-continuous fashion based on predetermined interval. In any event, the CRE 3 may receive the samples to identify one or more context characteristics represented within the audio samples 6. Periodically, the CRE 3 may then send the one or more identified context characteristics as configuration data 8 to the controller 4. The controller 4 may then store the configuration data 8 temporarily, e.g., in a memory. Alternatively, the controller 4 may provide the configuration data 8 to the grid manager 33 via a session message, e.g., an authentication message or other similar message, as it becomes available.

Continuing on, a PTT 41 may occur at a subsequent point in time when, for instance, a user desires to initiate a voice recognition task. The PTT 41 may not necessarily include a button press by a user and may also include the user vocalizing the "wakeup" keyword (or voice command), for example. The PTT 41 may then cause the controller 4 to establish a connection with the grid manager 43. For example, the controller 4 may utilize a secure socket layer (SSL) connection with the grid manager 43. Other connection protocols are within the scope of this disclosure and the provided example should not be construed as limiting. Once established, the controller 4 may then send a message 49 to the grid manager 43, with the message 49 including the configuration data 8. The message 49 may comprise, for instance, a session initialization message to authenticate the computing device 2 with the grid manager 43. In other cases, the message 49 may be subsequent to the session initialization message.

The grid manager 43 may then receive the message 49 from the controller 4. In response, the grid manager 43 may communicate with storage node(s) 44 and/or application node(s) 45 to retrieve one or more models (or recognition models) based on the configuration data 8 within the message 49. The storage node(s) 44 and/or application node(s) 45 may then load various models and applications to perform speech recognition. One or more handshaking messages 50 may be exchanged between the grid manager 43 and the application node(s) 44 and/or storage node(s) 45 to confirm each component/model was loaded and is ready to perform processing. In response to successful handshaking, the grid manager 43 may then send a session established message 42 to the controller 4. In response, the controller 4 may then begin streaming audio samples 6 to the remote voice recognition engine 12, and more specifically, the application node(s) 44 to begin voice recognition.

After the application node(s) 44 process the audio samples 6, a final result message 51 may be generated. The application node(s) 44 may then provide the final result message 51 to the controller 4 by way of the grid manager 43. The controller 4 may then perform one or more functions/commands based on the final result message 51, as discussed above with regard to FIG. 3.

After the final result message 51 is sent, the remote voice recognition engine 12 may then perform a cleanup routine 54. The cleanup routine 54 may cause various models and applications to be removed from memory. The cleanup routine 54 may further include the grid manager 43 committing one or more log file entries to a log node 46 for archive and debug purposes. The cleanup routine 54 may then end once the log node 46 sends an ACK message 52 to the grid manager 43. The ACK message 52 may therefore end the voice recognition session.

Example System

Figure 5:
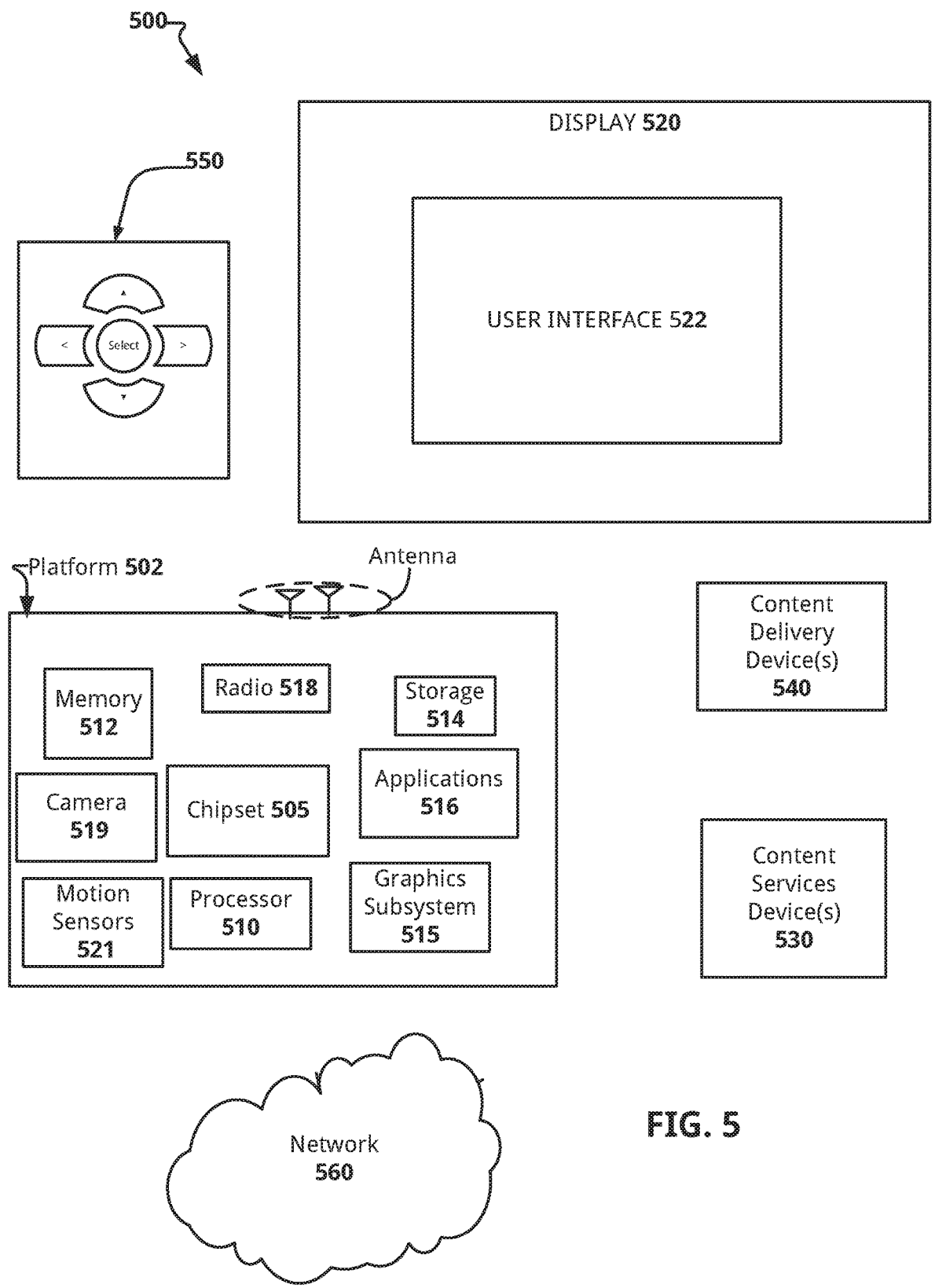
FIG. 5 illustrates a computer system configured to perform various processes disclosed herein, in accordance with an example embodiment of the present disclosure.

FIG. 5 illustrates a computing system 500 configured to perform various processes disclosed herein such as the process 30 of FIG. 3. In more detail, system 500 may be incorporated into a personal computer (PC), laptop computer, wearable computing device, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520, so as to supplement navigational gesturing by the user. Each of these example components is described in more detail below.

In some embodiments, platform 502 may comprise any combination of a chipset 505, processor 510, memory 512, storage 514, graphics subsystem 515, camera 519, motion sensors 521, applications 516 and/or radio 518 or wireless transceiver circuit. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 510 may comprise dual-core processor(s), dual-core mobile processor(s), and so forth. Memory 512 may be implemented, for instance, as a volatile memory device such as, but not limited to, a Random Access Memory (RAM), Dynamic Random Access Memory (DRAM), or Static RAM (SRAM). Storage 514 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 514 may comprise technology to increase the storage performance enhanced protection for valuable digital media when multiple hard drives are included, for example.

Graphics subsystem 515 may perform processing of images such as still or video for display, and in some embodiments is configured to synthesize face images, as variously described herein. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505. The graphics and/or video processing techniques, including the techniques for identifying and producing preferred face orientations described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In some embodiments, content services device(s) 530 may be hosted by any national, international and/or independent service and thus accessible to platform 502 via the Internet or other network, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520. In some embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, graphics, text, medical and gaming content, and so forth.

Content services device(s) 530 receives content such as cable television programming including media information, digital information, and/or other content. Examples of content providers may include any cable or satellite television or radio or Internet content providers. The provided examples are not meant to limit the present disclosure. In some embodiments, platform 502 may receive control signals from navigation controller 550 having one or more navigation features. The navigation features of controller 550 may be used to interact with user interface 522, for example. In some embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In some embodiments, controller 550 may not be a separate component but integrated into platform 502 and/or display 520. Embodiments, however, are not limited to the elements or in the context shown or described herein, as will be appreciated.

In some embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chipset 505 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, images (e.g., selfies, etc.), video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 5.

As described above, system 500 may be embodied in varying physical styles or form factors. FIG. 5 illustrates embodiments of a small form factor device 500 in which system 500 may be embodied. In some embodiments, for example, device 500 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, systems on-chip, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

Figure 6:
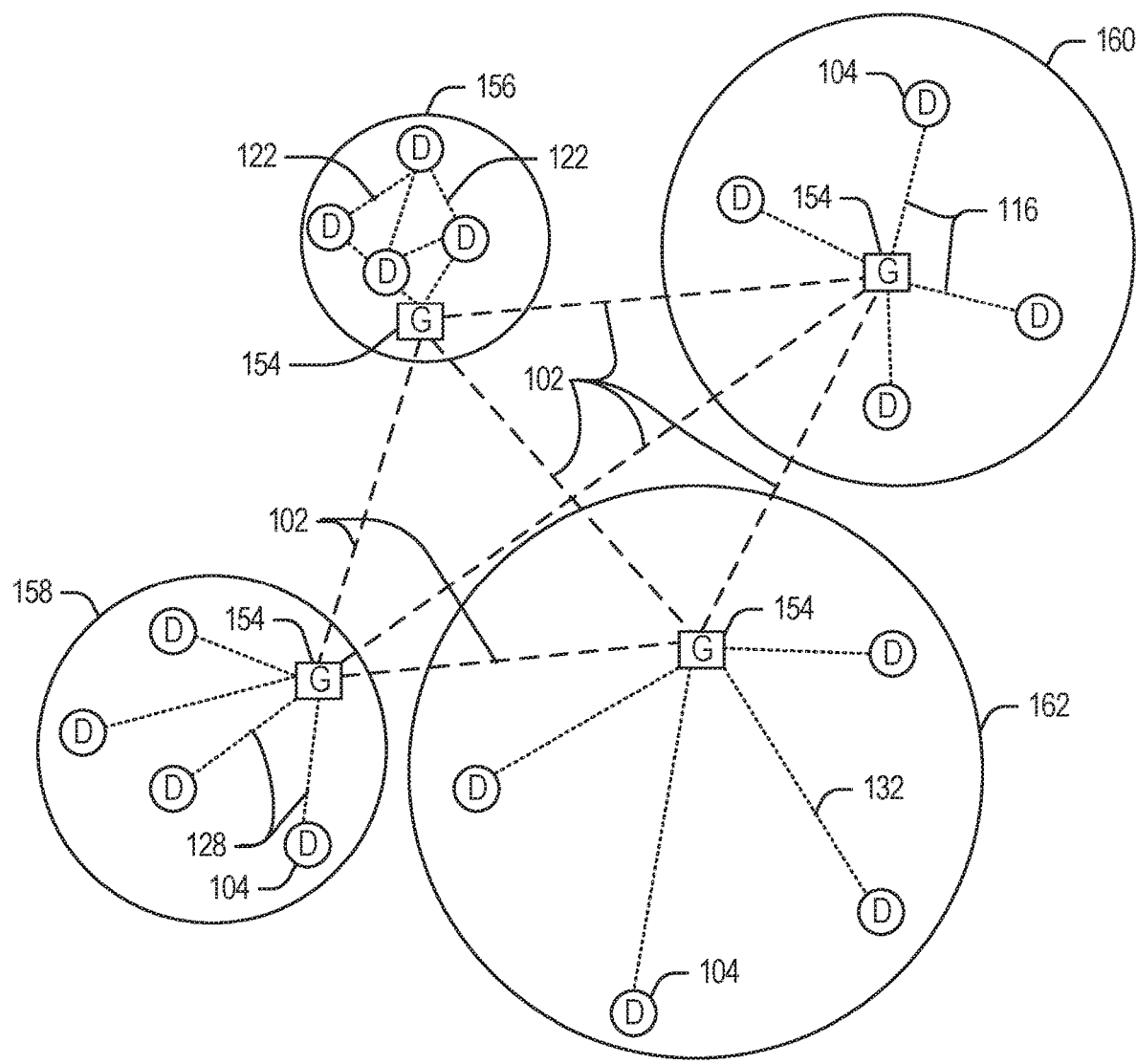
FIG. 6 illustrates an domain topology for respective internet-of-things (IoT) networks coupled through links to respective gateways, according to an example.

FIG. 6 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 7 below.

Figure 7:
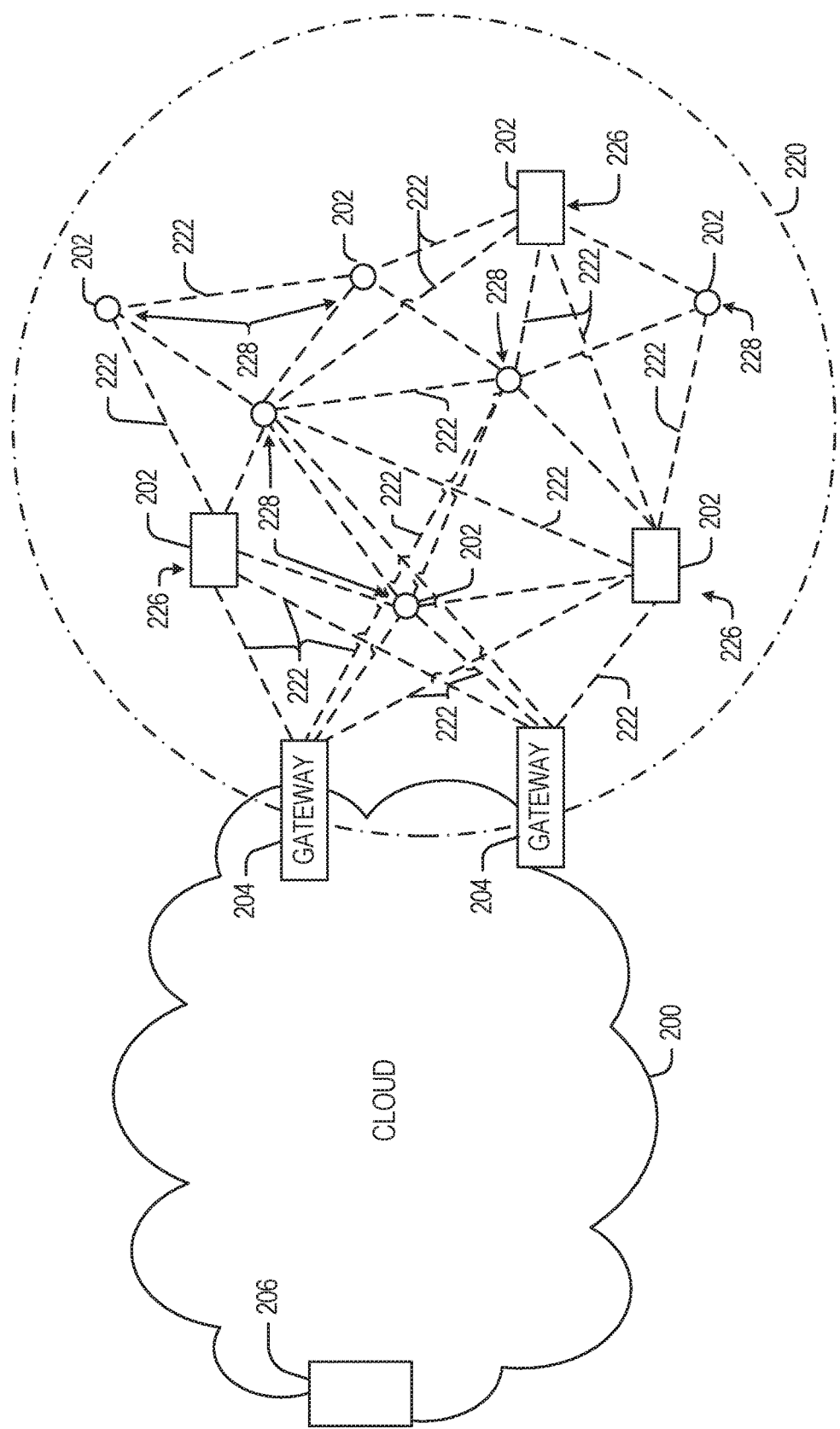
FIG. 7 illustrates a cloud computing network in communication with a mesh network of IoT devices operating as a fog device at the edge of the cloud computing network, according to an example.

FIG. 7 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

In other examples, the operations and functionality described above with reference to FIGS. 1 to 5 may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
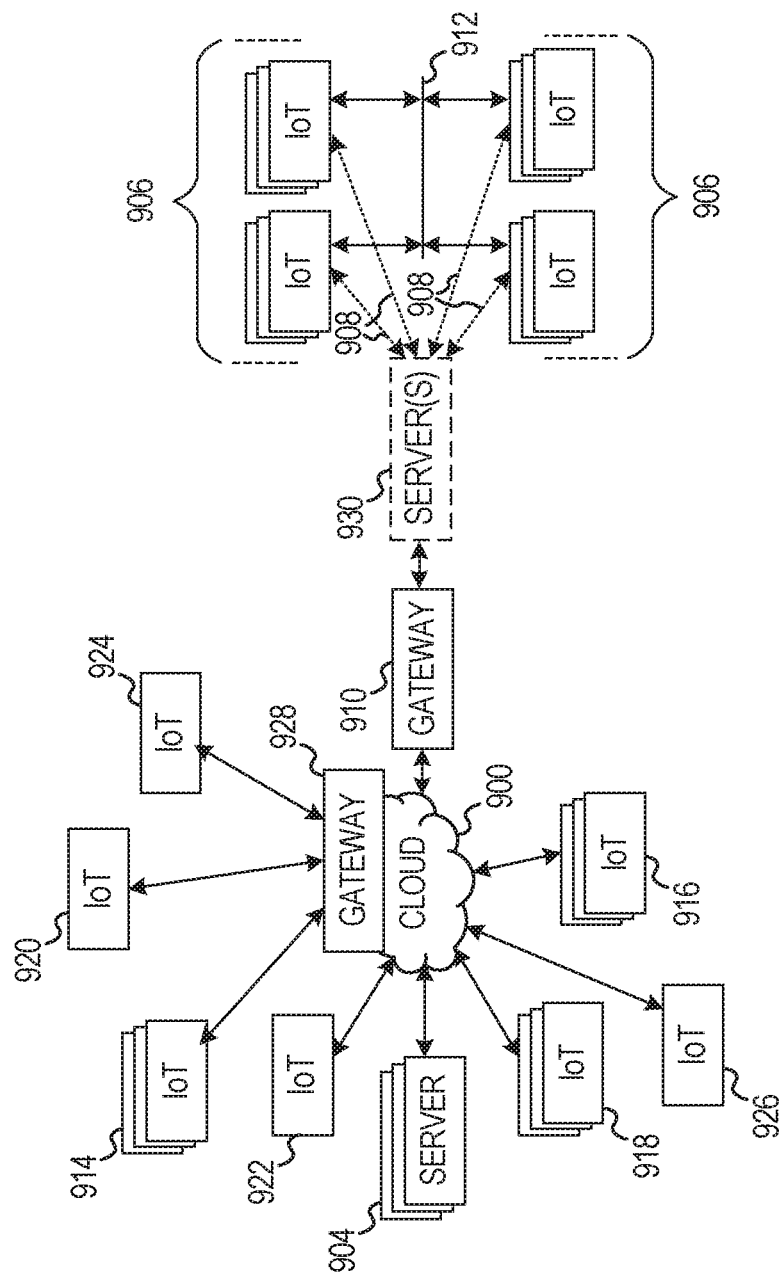
FIG. 8 illustrates a block diagram of a network illustrating communications among a number of IoT devices, according to an example.

FIG. 8 illustrates a drawing of a cloud computing network, or cloud 900, in communication with a number of Internet of Things (IoT) devices. The cloud 900 may represent the Internet, or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system (not shown, but depicted in FIG. 7), or a combination therein. The groups of IoT devices may be deployed in various residential, commercial, and industrial settings (including in both private or public environments).

Figure 9:
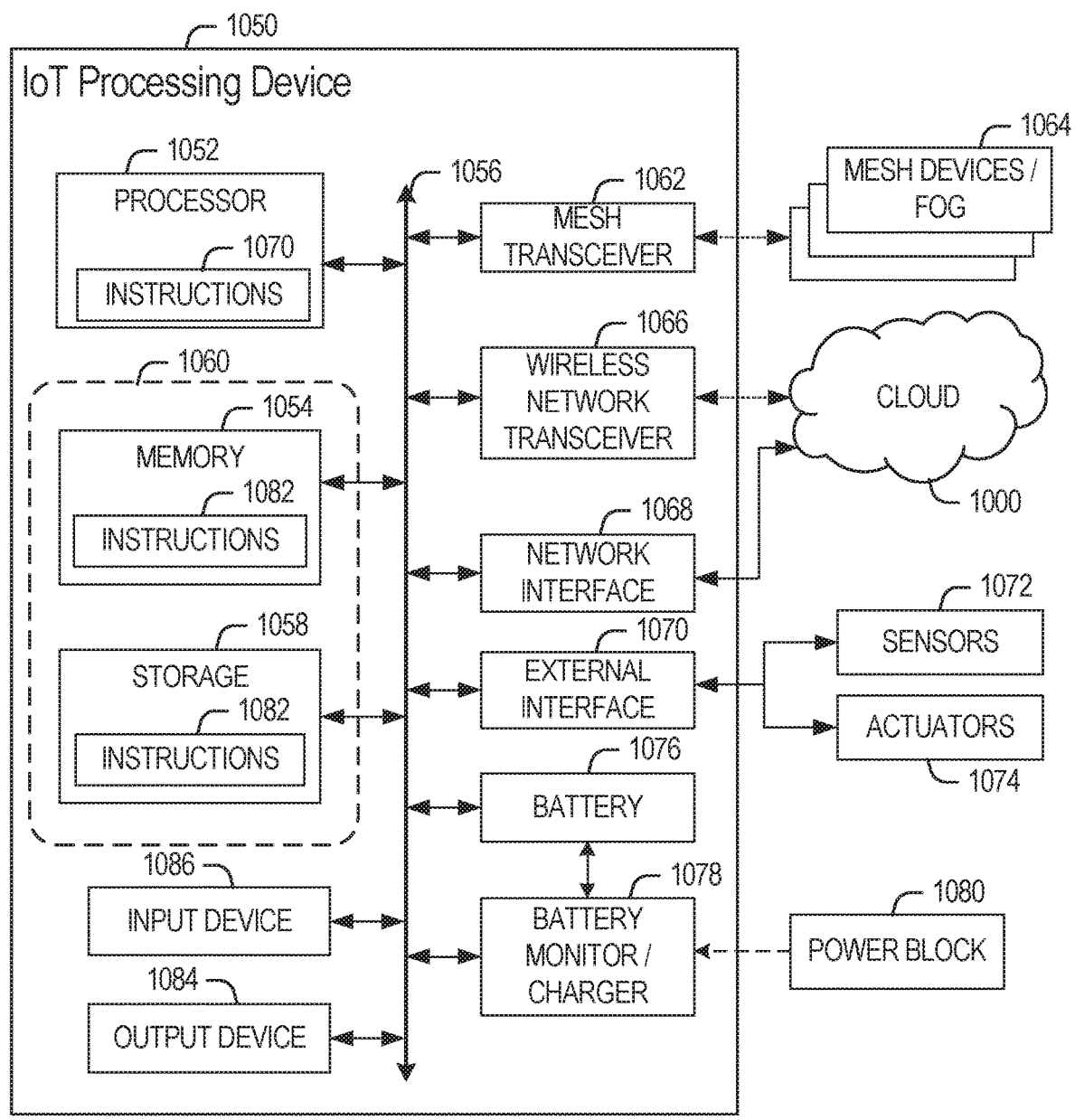
FIG. 9 illustrates a block diagram for an example IoT processing system architecture upon which any one or more of the techniques (e.g., operations, processes, methods, and methodologies) discussed herein may be performed, according to an example.

As can be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system (e.g., as described above with reference to FIG. 7).

FIG. 9 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 9 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 802.15.4, or IEEE 802.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 9 or may include specific storage units such as optical disks, flash drives, or any number of other hardware devices. The non-transitory, machine readable medium 1060 may include instructions to direct the processor 1052 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Further Example Embodiments

The following examples pertain to further embodiments, from which numerous permutations and configurations will be apparent.

Example 1 discloses a device comprising a memory, a controller coupled to the memory, the controller configured to receive a plurality of audio samples, identify at least one context characteristic associated with the received plurality of audio samples, and establish a connection to a voice recognition engine, and in response to establishing the connection, send a session initialization message to the voice recognition engine, the session initialization message to cause the voice recognition engine to load one or more models into a memory based at least in part on the at least one identified context characteristic.

Example 2 includes the subject matter of Example 1, wherein the at least one identified context characteristic comprises at least one of a signal quality indicator, a speaker identity, a speaker gender, a speaker mood, a language identifier, and/or a domain classification.

Example 3 includes the subject matter of any one of Examples 1-2, wherein the controller is further configured to send the session initialization message to the voice recognition engine prior to sending the received plurality of audio samples to the voice recognition engine.

Example 4 includes the subject matter of any one of Examples 1-3, wherein the controller is further configured to receive a session established message, and in response to receiving the session established message, send the received plurality of audio samples to the voice recognition engine, and wherein the session established message indicates that the voice recognition engine has loaded one or more speech recognition components based at least in part on the at least one identified context characteristic.

Example 5 includes the subject matter of any one of Examples 1-4, wherein the controller establishes the connection with the voice recognition engine based on detecting a push-to-talk (PTT) event.

Example 6 includes the subject matter of any one of Examples 1-5, wherein the controller establishes the connection with the voice recognition engine based on detecting a wakeup voice command spoken by a user.

Example 7 includes the subject matter of any one of Examples 1-6, wherein the at least one identified context characteristic comprises two or more domain classifiers.

Example 8 includes the subject matter of any one of Examples 1-7, wherein the at least one identified context characteristic comprises two or more language identifiers.

Example 9 includes the subject matter of Example 8, wherein each of the two or more language identifiers are associated with a first and second confidence score, respectively.

Example 10 includes the subject matter of any one of Examples 1-9, wherein the controller is further configured to instantiate a context recognition engine (CRE), the CRE including a plurality of processing stages for context recognition, and wherein the controller is further configured to identify the one or more context characteristics based on the CRE.

Example 11 includes the subject matter of Example 10, wherein the CRE analyzes the received audio samples at a predetermined interval.

Example 12 includes the subject matter of any one of Examples 1-11, wherein the controller stores the at least one identified context characteristic in the memory until a user-event is detected, and wherein the session initialization message includes configuration data based on the at least one identified context characteristic stored in the memory.

Example 13 includes the subject matter of any one of Examples 1-12, wherein the controller continuously receives audio samples.

Example 14 includes the subject matter of any one of Examples 1-13, further comprising one or more sensors, the one or more sensors including at least one or more of a global positioning system (GPS) sensor, an accelerometer, and/or a gyroscope.

Example 15 includes the subject matter of Example 15, wherein the session initialization message includes sensor data from the one or more sensors.

Example 16 includes the subject matter of any one of Examples 1-15, wherein the controller is further configured to receive a result message from the voice recognition engine, and in response to receiving the result message, perform one or more functions based on the received result message.

Example 17 includes the subject matter of any one of Examples 1-16, wherein the voice recognition engine is a cloud-based voice recognition engine.

Example 18 includes the subject matter of any one of Examples 1-17, wherein the controller comprises a digital signal processor (DSP).

Example 19 includes a plurality of networked devices implementing the subject matter of any one of Examples 1-16.

Example 20 discloses a computer-implemented method for performing client-side domain detection on a plurality of audio samples, the method comprising receiving, by a controller, a plurality of audio samples, identifying, by the controller, at least one context characteristic associated with the plurality of audio samples, and establishing, by the controller, a connection with a voice recognition engine, and in response to establishing the connection, sending a session initiation message, the session initiation message including at least one configuration parameter based on the at least one identified context characteristic, and wherein the session initiation message is configured to cause the voice recognition engine to load one or more recognition components.

Example 21 includes the subject matter of Example 20, further comprising receiving, by the controller, a session established message from the voice recognition engine, and in response to receiving the session established message, sending by the controller the received plurality of audio samples to the voice recognition engine.

Example 22 includes the subject matter of any one of Examples 20-21, wherein the at least one identified context characteristic comprises at least one of a signal quality indicator, a speaker identity, a language identifier, and/or a domain classification.

Example 23 includes the subject matter of any one of Examples 20-22, further comprising detecting, by controller, a user-input event, and wherein establishing the connection with the voice recognition engine is based on the detected user-input event.

Example 24 includes the subject matter of Example 23, wherein the user-input event comprises a push-to-talk (PTT) event.

Example 25 includes the subject matter of Example 23, wherein the user-input event comprises a wakeup voice command.

Example 26 includes the subject matter of any one of Examples 20-25, further comprising storing, by the controller, the at least one identified context characteristic in a memory, and wherein the session initialization message includes configuration data based on the at least one identified context characteristic stored in the memory.

Example 27 includes the subject matter of any one of Examples 20-26, further comprising receiving, by the controller, sensor data from one or more sensors, and wherein the session initialization message comprises the sensor data.

Example 28 includes the subject matter of Example 27, wherein the one or more sensors comprise at least one or more of a global positioning system (GPS) sensor, an accelerometer, and/or a gyroscope.

Example 29 includes the subject matter of any one of Examples 27-28, wherein the session initialization message includes sensor data from the one or more sensors.

Example 30 includes the subject matter of any one of Examples 20-29, further comprising receiving, by the controller, a result message from the voice recognition engine, and in response to receiving the result message, performing one or more functions based on the received message.

Example 31 includes the subject matter of any one of Examples 20-30, wherein the voice recognition engine is a cloud-based voice recognition engine.

Example 32 includes the subject matter of any one of Examples 20-31, wherein establishing the connection with the voice recognition engine includes using a secure socket layer (SLL) connection.

Example 33 discloses a non-transitory computer-readable medium having a plurality of instructions encoded thereon that when executed by at least one processor cause a process to be carried out, the process being configured to receive a plurality of audio samples, identify at least one context characteristic associated with the plurality of audio samples, and establish a connection with a voice recognition engine, and in response to establishing the connection, send a session initiation message, the session initiation message including at least one configuration parameter based on the at least one identified context characteristic, and wherein the session initiation message is configured to cause the voice recognition engine to load one or more recognition components.

Example 34 includes the subject matter of Example 33, wherein the process is further configured to receive a session established message from the voice recognition engine, and in response to receiving the session established message, send the received plurality of audio samples to the voice recognition engine.

Example 35 includes the subject matter of any one of Examples 33-34, wherein the at least one identified context characteristic comprises at least one of a signal quality indicator, a speaker identity, a language identifier, and/or a domain classification.

Example 36 includes the subject matter of any one of Examples 33-35, wherein the process is further configured to detect a user-input event, and wherein establishing the connection with the voice recognition engine is based on the detected user-input event.

Example 37 includes the subject matter of Example 36, wherein the user-input event comprises a push-to-talk (PTT) event.

Example 38 includes the subject matter of Example 36, wherein the user-input event comprises a wakeup voice command.

Example 39 includes the subject matter of any one of Examples 33-38, wherein the process is further configured to store the at least one identified context characteristic in a memory, and wherein the session initialization message includes configuration data based on the at least one identified context characteristic stored in the memory.

Example 40 includes the subject matter of any one of Examples 33-39, wherein the process is further configured to receive sensor data from one or more sensors, and wherein the session initialization message comprises the sensor data.

Example 41 includes the subject matter of Example 40, wherein the one or more sensors comprise at least one or more of a global positioning system (GPS) sensor, an accelerometer, and/or a gyroscope.

Example 42 includes the subject matter of Example 40, wherein the session initialization message includes sensor data from the one or more sensors.

Example 43 includes the subject matter of any one of Examples 33-42, wherein the process is further configured to receive a result message from the voice recognition engine, and in response to receiving the result message, performing one or more functions based on the received message.

Example 44 includes the subject matter of any one of Examples 33-43, wherein the voice recognition engine is a cloud-based voice recognition engine.

Example 45 includes the subject matter of any one of Examples 33-44, wherein establishing the connection with the voice recognition engine includes using a secure socket layer (SLL) connection.

Example 46 discloses a computing device for providing a voice recognition engine, the computing device comprising a memory, a controller coupled to the memory, the controller configured to receive a session initialization message from a user device, the session initialization message including one or more identified characteristics associated with a plurality of audio samples, and in response to receiving the session initialization message, causing to be instantiated one or more recognition components to process the plurality of audio samples.

Example 47 includes the subject matter of Example 46, wherein the controller is further configured to send a session established message to the user device in response to the instantiation of the one or more recognition components.

Example 48 includes the subject matter of any one of Examples 46-47, wherein the controller communicates with at least one of a storage node and/or application node via a network to instantiate the one or more recognition components.

Example 49 includes the subject matter of any one of Examples 46-48, wherein the controller is further configured to receive audio samples from the user device, and wherein the controller analyzes the received audio samples via the one or more instantiated recognition components.

Example 50 includes the subject matter of any one of Examples 46-49, wherein the one or more recognition components include at least one of an application engine and a language model.

Example 51 includes the subject matter of any one of Examples 46-50, wherein the controller is further configured to send a response message to the user device after processing the plurality of received audio samples through the one or more instantiated recognition components.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A device comprising:
    a memory;
    a first processor coupled to the memory, wherein the first processor includes a low power mode, wherein while in the low power mode the first processor being configured to:
    receive a plurality of audio samples;
    identify at least one context characteristic associated with the received plurality of audio samples, wherein the at least one context characteristic includes linguistic characteristics associated with the received plurality of audio samples, wherein the at least one context characteristic includes a keyword or key phrase; and
    a second processor to remotely host a voice recognition engine to analyze speech, and in response to establishing communication with the first processor, receive a session initialization message by the voice recognition engine, wherein the session initialization message includes the at least one context characteristic, wherein the session initialization message to cause the voice recognition engine to load one or more models into a memory based at least in part on the at least one identified context characteristic, wherein the voice recognition engine analyzes speech from at least part of the plurality of audio samples with the one or more models;
    Wherein the session initialization message includes sensor data from a gyroscope.

2. The device of claim 1, further comprising one or more sensors, the one or more sensors including at least one or more of a global positioning system (GPS) sensor, an accelerometer, and/or a gyroscope.

3. The device of claim 2, wherein the session initialization message includes sensor data from the one or more sensors.

4. The device of claim 1, wherein the at least one identified context characteristic comprises at least one of a signal quality indicator, a speaker identity, a speaker gender, a speaker mood, a language identifier, and/or a domain classification.

5. The device of claim 1, wherein the first processor is further configured to send the session initialization message to the voice recognition engine prior to sending the received plurality of audio samples to the voice recognition engine.

6. The device of claim 1, wherein the first processor is further configured to receive a session established message, and in response to receiving the session established message, send the received plurality of audio samples to the voice recognition engine, and wherein the session established message indicates that the voice recognition engine has loaded one or more speech recognition components based at least in part on the at least one identified context characteristic.

7. The device of claim 1, wherein the first processor establishes the connection with the voice recognition engine based on detecting a wakeup voice command spoken by a user.

8. The device of claim 1, wherein the second processor is further configured to instantiate a context recognition engine (CRE), the CRE including a plurality of processing stages for context recognition, and wherein the second processor is further configured to identify the one or more context characteristics based on the CRE.

9. The device of claim 1, wherein the first processor is further configured to receive a result message from the voice recognition engine, and in response to receiving the result message, perform one or more functions based on the received result message.

10. A plurality of networked devices implemented as the device of claim 1.

11. A computer-implemented method for performing client-side domain detection on a plurality of audio samples, the method comprising:
    receiving, with a first processor, a plurality of audio samples, wherein the first processor includes a low power mode, wherein receiving the plurality of audio samples includes receiving the plurality of audio samples while the first processor operates in the low power mode;
    identifying, with the first processor, at least one context characteristic associated with the plurality of audio samples, wherein the at least one context characteristic includes linguistic characteristics associated with the received plurality of audio samples, wherein the at least one context characteristic includes a keyword or a key phrase; and
    hosting, with a second processor that is remotely coupled to the first processor, a voice recognition engine to analyze speech, and in response to establishing a connection with first processor, receiving a session initiation message, the session initiation message including at least one configuration parameter based on the at least one identified context characteristic and/or the at least one context characteristic, and wherein the session initiation message is configured to cause the voice recognition engine to load one or more recognition components, wherein the voice recognition engine analyzes speech from at least part of the plurality of audio samples with the one or more recognition components;

Wherein the session initialization message includes sensor data from a gyroscope.

12. The computer-implemented method of claim 11, further comprising:
receiving, by the first processor, a session established message from the voice recognition engine; and
in response to receiving the session established message, sending by the first processor the received plurality of audio samples to the voice recognition engine.

13. The computer-implemented method of claim 11, wherein the at least one identified context characteristic comprises at least one of a signal quality indicator, a speaker identity, a language identifier, and/or a domain classification.

14. The computer-implemented method of claim 11, further comprising detecting, by the first processor, a user-input event, and wherein establishing the connection with the voice recognition engine is based on the detected user-input event.

15. The computer-implemented method of claim 11, further comprising receiving, by the first processor, a result message from the voice recognition engine, and in response to receiving the result message, performing one or more functions based on the received message.

16. A non-transitory computer-readable medium having a plurality of instructions encoded thereon that when executed by at least one processor cause a process to be carried out, the process being configured to:
receive, with a first processor, a plurality of audio samples, wherein the first processor includes a low power mode, wherein receive the plurality of audio samples includes receive the plurality of audio samples while the first processor operates in the low power mode;
identify, with the first processor, at least one context characteristic associated with the plurality of audio samples, wherein the at least one context characteristic includes linguistic characteristics associated with the received plurality of audio samples, wherein the at least one context characteristic includes a keyword or a key phrase; and host, with a second processor that is remotely coupled to the first processor, a voice recognition engine to analyze speech, and in response to establishing a connection with first processor, receive a session initiation message, the session initiation message including at least one configuration parameter based on the at least one identified context characteristic and/or the at least one context characteristic, and wherein the session initiation message is configured to cause the voice recognition engine to load one or more recognition components, wherein the voice recognition engine analyzes speech from at least part of the plurality of audio samples with the one or more recognition components;

Wherein the session initialization message includes sensor data from a gyroscope.

17. The computer-readable medium of claim 16, wherein the process is further configured to:
receive a session established message from the voice recognition engine; and
in response to receiving the session established message, send the received plurality of audio samples to the voice recognition engine.

18. The computer-readable medium of claim 16, wherein the at least one identified context characteristic comprises at least one of a signal quality indicator, a speaker identity, a language identifier, and/or a domain classification.

19. The computer-readable medium of claim 16, wherein the process is further configured to receive a result message from the voice recognition engine, and in response to receiving the result message, performing one or more functions based on the received message.

* * * * *